United States Patent [19]

Nash et al.

[11] Patent Number: 4,907,811
[45] Date of Patent: Mar. 13, 1990

[54] STRETCHABLE OIL SEAL AND METHOD OF INSTALLATION

[75] Inventors: Stephen E. Nash, Lakeland; Gerald P. Pichler, Dearborn, both of Mich.

[73] Assignee: Federal-Mogul Corporation, Southfield, Mich.

[21] Appl. No.: 372,208

[22] Filed: Jun. 26, 1989

Related U.S. Application Data

[63] Continuation of Ser. No. 149,466, Jan. 28, 1988, abandoned.

[51] Int. Cl.[4] .................................................. F16J 15/32
[52] U.S. Cl. ........................................... 277/9; 277/9.5; 277/134; 277/136; 277/152; 277/153
[58] Field of Search ............... 277/1, 9, 9.5, 10, 11, 277/134, 136, 152, 153

[56] References Cited

U.S. PATENT DOCUMENTS

| | | |
|---|---|---|
| 2,272,650 | 2/1942 | Von Veh . |
| 2,830,858 | 4/1958 | Moorman et al. ............ 277/153 X |
| 3,440,122 | 4/1969 | McCormick ................. 277/153 X |
| 3,455,564 | 7/1969 | Dega ............................ 277/153 X |
| 3,921,988 | 11/1975 | Prasse et al. ................. 277/168 |
| 4,114,897 | 9/1978 | Bainard ........................ 277/1 |
| 4,126,316 | 11/1978 | Cather, Jr. ................... 277/1 |
| 4,145,057 | 3/1979 | Wheeler ....................... 277/153 X |
| 4,334,687 | 6/1982 | Holzer et al. ................ 277/152 X |
| 4,469,017 | 9/1984 | Hanlon ........................ 277/152 X |

Primary Examiner—William A. Cuchlinski, Jr.
Assistant Examiner—Jeffrey Hohenshell
Attorney, Agent, or Firm—Lawrence J. Shurupoff

[57] ABSTRACT

A fluid seal made of elastomeric material for use between an external stationary member and a rotating internal member avoids use of a customary pressed steel case. The seal may be stretched over an external flange on a rotatable shaft and recover from the elongation to the designed dimension at which the seal is to operate within the external stationary member. A specially formulated elastomeric composition accommodates elongation during stretching in excess of 300%.

8 Claims, 4 Drawing Sheets

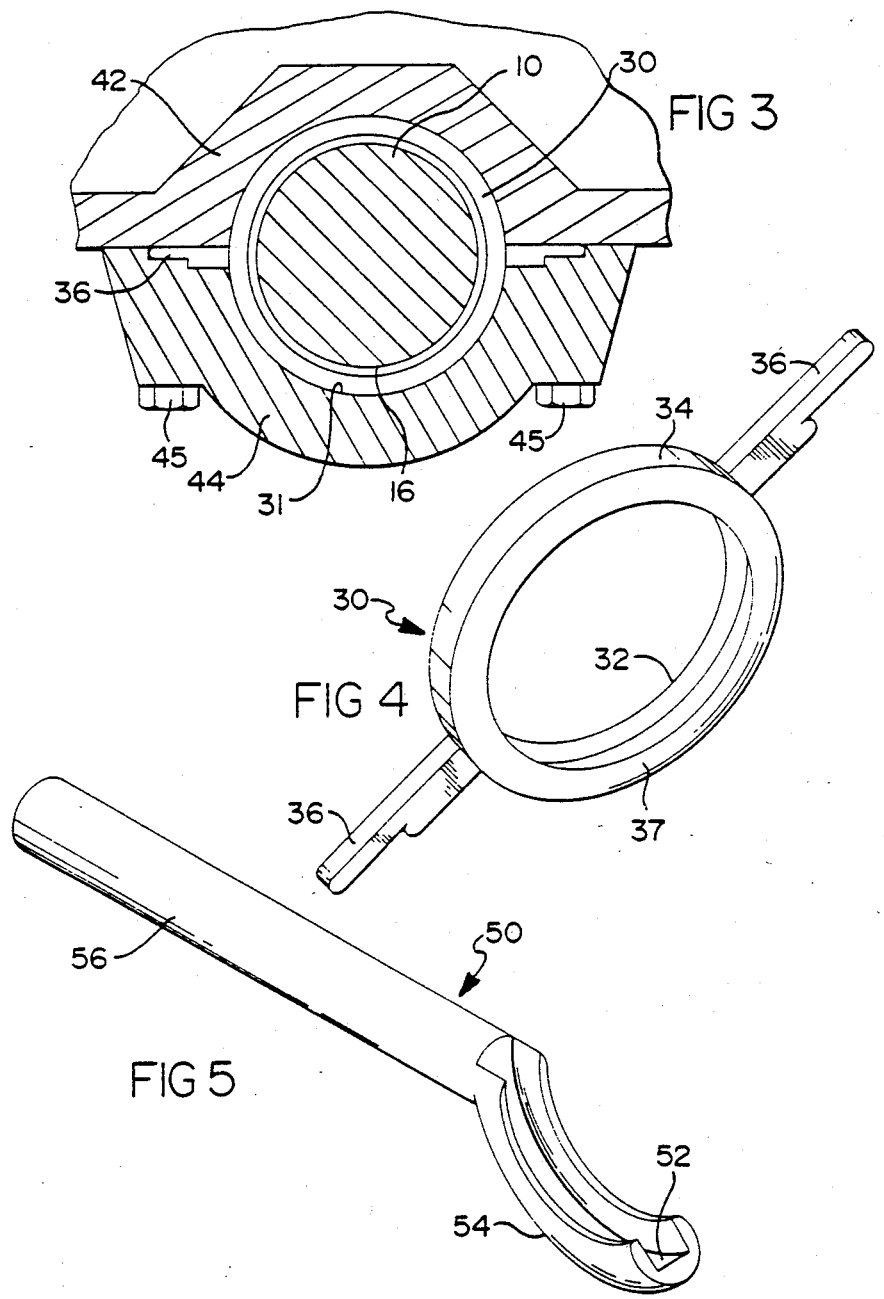

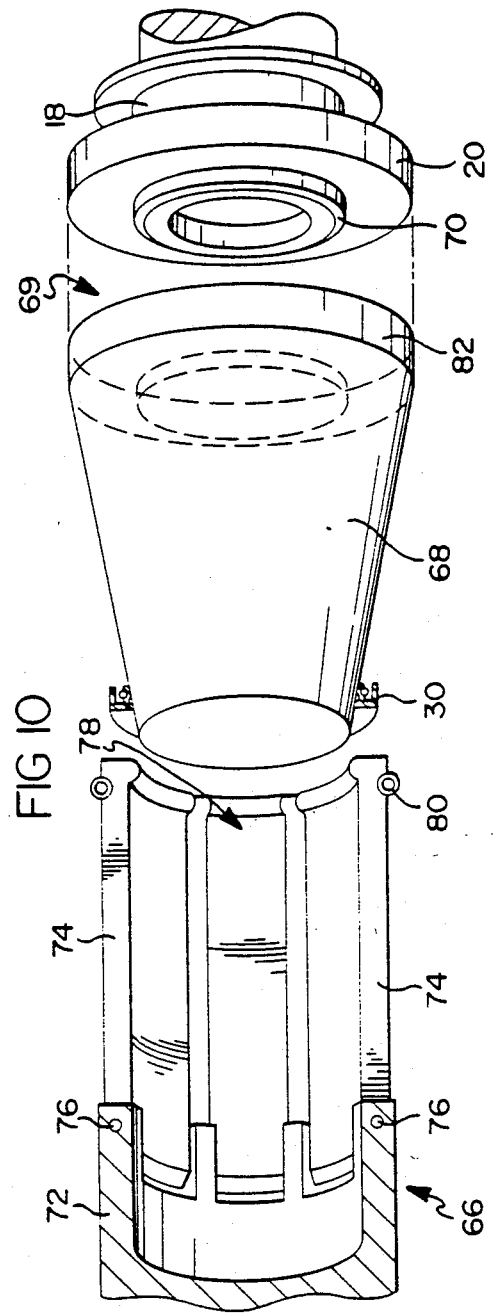
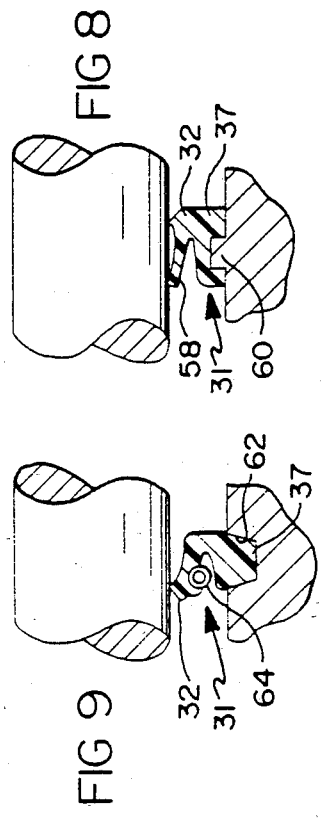
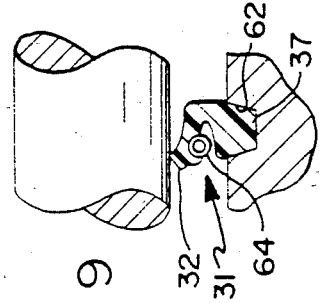

STRETCHABLE OIL SEAL AND METHOD OF INSTALLATION

This application is a continuation, of application Ser. No. 149,466, filed Jan. 28, 1988 now abandoned.

BACKGROUND OF THE INVENTION

1. Field Of The Invention

This invention relates to an elastomeric oil seal which may be stretched during installation to a diameter substantially greater than its ultimate operational diameter and yet recover to serve as an effective and reliable oil seal.

2. Description Of Prior Developments

Although oil seals have been under development for many years, the design of seals for the rear end of an automotive crankshaft still poses several unique problems which heretofore have been left unsolved. One particularly bothersome design problem is caused by a radially extending flange projecting from the rear end of many conventional engine crankshafts. More particularly, the rear end of many crankshafts terminates in a flange which is much larger than the diameter of the inboard sealing position about which an oil seal is typically mounted. This arrangement can significantly complicate the installation of a seal around its inboard location. Since the flange is essential for connecting the power output end of the crankshaft to a flywheel and to a drive train leading to the rear wheels, it is necessary to design a seal which may be installed in a manner which accommodates the flange rather than to eliminate the flange from the crankshaft.

Rear crankshaft seals were originally constructed by wrapping a length of rope around the crankshaft at the rear sealing position and clamping the rope in place between the engine case and an extension of the rear bearing cap. This type of seal worked initially but its effectiveness was characteristically short lived and resulted in oily garage floors and oil slicks along the highways.

When elastomers were developed that could cope with the exotic additives and oils and high operating temperatures of modern automobiles, semicircular seals were molded in matched pairs and installed on opposing sides of the crankshaft during engine assembly. This improved the dependability of the seals over prior designs but presented another problem. The interfaces or contacting surfaces between the two seal halves often did not fit properly or wore unevenly and resulted in oil leakage, often after only a few miles of operation.

During a subsequent period of seal development which has lasted for at least the last twenty years, automobile manufacturers have been searching for some type of one-piece oil seal that could be used reliably in the rear crank position. Until the present invention, engineers have been trying to develop such a one-piece seal without notable success.

Some prior sealing device structures include U.S. Pat. No. 2,523,604 which discloses a rear crankshaft oil seal somewhat similar to the present invention. However, this seal is split to enable the seal to encircle the crankshaft. This split can easily create a leakage path from the sealed fluid to the environment. In contrast, the present invention provides a continuous unbroken sealing member which is stretched over the flange and relies on elastomeric memory for recovery into its sealing configuration.

U.S. Pat. No. 4,145,057 shows a complete circular sealing element for use as a packing between a cylinder and a piston where the relative motion between the piston and seal is axial. In this configuration no flange is present which has a diameter greater than the diameter of the piston over which the packing must be stretched. Further, the packing has no feature that would prevent rotational movement between either of the sealed members and the packing. In the present invention, the centrifugal force of the sealed fluid requires the external periphery of the seal to form a static seal with the encircling bore.

SUMMARY OF THE INVENTION

This invention is directed to an elastomeric radial-lip oil seal for use in special applications such as flanged crankshaft applications, where the seal must be stretched beyond the limit to which any standard metal cased seal could be stretched or elongated during normal installation and assembly operations. This invention eliminates the circumferential metal case that anchors a standard oil seal by compression or interference within a housing bore and accomplishes the anchoring function with integrally molded external irregularities in the elastomer which match or are contained within a surrounding bore. In many crankshaft applications the elastomer must withstand elongations in excess of 300%—three times its original non-stretched length. Recovery from such elongation after installation may take from one minute to eighteen hours depending on the memory of the specific elastomeric compound used and the extent of the stretching required for assembly. The continuous one-piece seal of the invention has no potential leak path along joining surfaces as found in the slit or split seals that are presently used.

In many applications, sharp metal edges are encountered by the seal during the installation stretching process. These sharp edges can easily cut or sever the relatively soft elastomeric seal materials. In most elastomers, such cuts propigate rapidly and destroy the integrity of the stretched part. This condition requires the use of special assembly tools to protect the elastomer from being cut or abraded while it is being stretched during installation.

It is therefore an object of the invention to provide a homogeneous, all-elastomer oil seal which may be stretched over a flange without damage.

Another object is to provide a shaft seal which is formed of an elastomeric material which may be stretched over a flange, yet return to its original dimensions so as to form a positive seal around a shaft.

Still another object is to provide an installation tool which facilitates seal stretching and installation procedures while protecting the seal from damage due to abrasion and cutting.

Yet another object is to provide a protective covering member for covering sharp machine elements over which the seal is stretched during installation.

BRIEF DESCRIPTION OF THE DRAWINGS

Various other objects, features and advantages of the present invention will become better understood from the following description, when considered in conjunction with the accompanying drawings, wherein:

FIG. 3 is a schematic view, partly in section showing the seal of FIG. 4 applied to a shaft and clamped between engine housing or cover members;

FIG. 4 is a view in perspective showing one seal embodiment that may be used for the application shown in FIG. 2;

FIG. 5 is a view in perspective of an example of an installation tool for installing a seal of the present invention;

FIGS. 8 and 9 are partial cross-sections of other seal mounting arrangements that are applicable to the present invention; and FIG. 10 is a schematic view, partly in section showing an alternate form of installation tool for stretching the seal over a flange.

DESCRIPTION OF A PREFERRED EMBODIMENT

Figures 1, 2:
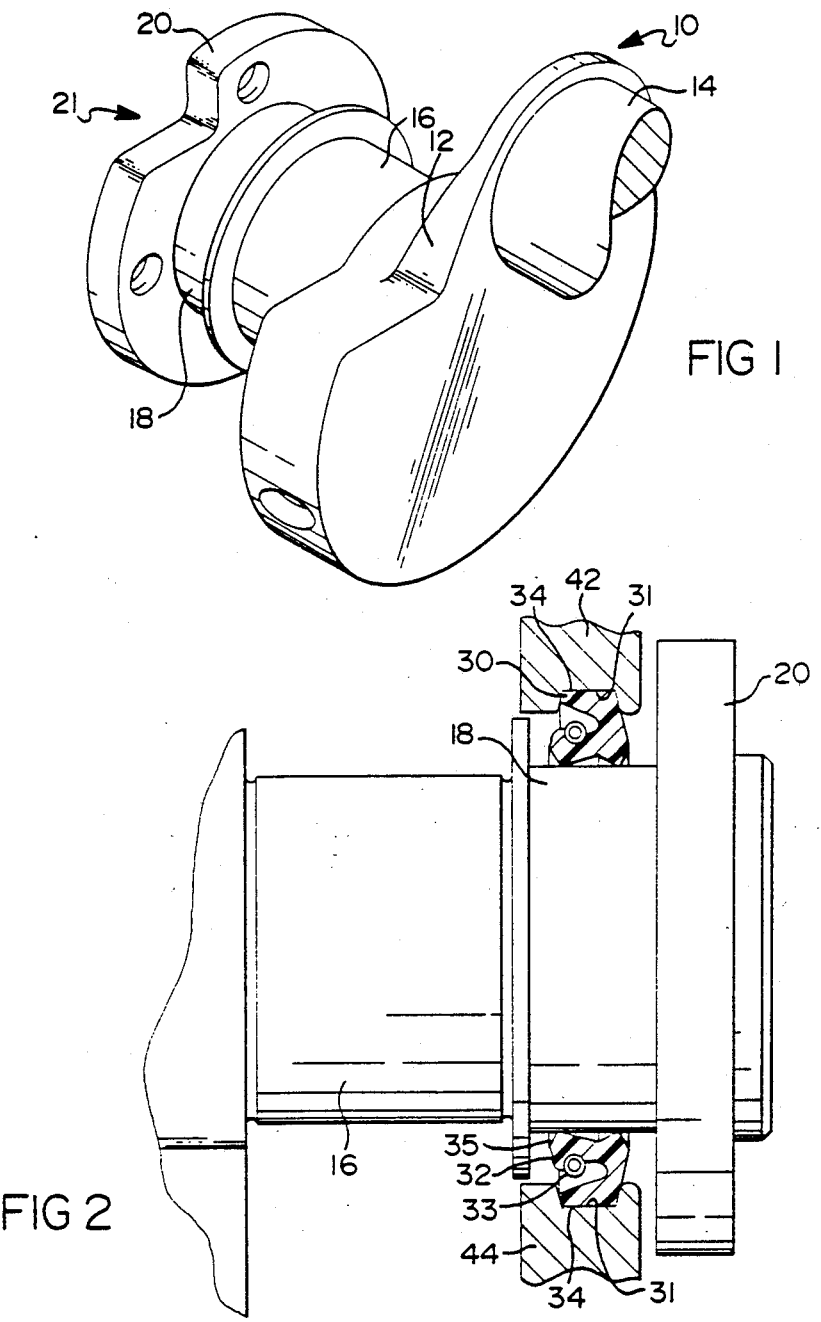
FIG. 1 is a perspective view showing a typical rotating element on which the present invention may be applied.
FIG. 2 is a fragmentary view in partial section showing an application of the present invention on the configuration of FIG. 1.

The present invention will now be described in conjunction with the drawings, beginning with FIG. 1 which shows a rotating machine element such as crankshaft 10 to which the present invention may be applied. The crankshaft of a modern automobile necessitates a complicated configuration defining several crank throws of which only the last one is shown at 12. The corresponding rear crank bearing position 14 is located at one end of crank throw 12 and the rear main bearing position 16 is located at the other end.

The rear crank sealing position is shown at 18, and the rear crank flange at 20. The rear crank flange 20 often includes a positioning slot 21 which is useful in rotationally positioning the crankshaft 10 so that engine timing events occur in their proper order. Clearly, one-piece conventional steel reinforced oil seals could not be installed at the sealing position 18 as the annular steel reinforcing members could not be stretched over the flange 20. However, a non-reinforced elastomeric seal, formed as discussed below, can be easily stretched over flange 20 thereby avoiding leakage paths created by conventional one-piece single slit or two-piece split seals.

FIGS. 2 and 3 show the stretch seal 30 of FIG. 4 being held in a split housing bore 31. The upper seal housing member 42 is typically bolted to the lower seal housing member 44 during assembly and after the stretch seal 30 has been stretched over flange 20 and mounted over the proper position 18 on the rear of the crankshaft.

FIGS. 2 and 4 show a typical arrangement of the three essential parts of the stretch seal 30. The dynamic lip seal 32 having generally radially inwardly converging frustoconical surfaces 33,35 is disposed on the inside diameter of the elastomer seal body 37 to prevent oil from leaking along the rotating crankshaft. The static annular outer sealing surface 34 is disposed on the outside diameter of the elastomer seal and seats within the split housing bore 31 shown in FIG. 2. The upper seal housing member 42 of the split bore is typically formed as part of the cylinder block and the lower seal housing member 44 is typically formed as part of the rear main bearing cap. As applied in FIGS. 2 and 3, seal portion 34 prevents oil leaking through the bore adjacent the housing member.

Elastomer extensions 36 may be integrally molded on at least one side and preferably both sides of the outer seal periphery. These extensions perform two functions. First, the extensions are molded sufficiently large so that they more than fill the cavity along the area where the two seal housing members 42 and 44 meet. As bolts 45 are tightened to secure the rear bearing (not shown) and the rear crankshaft seal 30 during assembly, the seal extensions 36 become compressed so as to form a gasket between the two seal housing members 42 and 44, thereby preventing the escape of oil past these interfaces.

Second, the extensions 36 are molded as integral parts of the seal and being secured as they are between the seal housing members 42 and 44, the extensions effectively axially anchor the stretch seal 30 in the proper location and prevent it from rotating when the crankshaft 10 is turned. This is very important because the static seal formed along the outside sealing surface 34 is typically not shaped to act as a dynamic seal such as formed by seal lip 32. The shaft and seal assembly would most likely leak if relative rotational motion were allowed between the seal housing members 42 and 44 and the sealing surface 34 formed along the outside diameter of the seal 30.

It should be noted that the cross-section of an oil seal has an area of many square millimeters and the elastomers from which oil seals are made are typically quite inflexible by comparison to elastomers which are specifically intended for stretching. It would be quite impossible, therefore, to elongate the elastomer of a conventional oil seal by roughly 100% to over 300% which the present invention requires, without adversely affecting the resulting seal performance. Accordingly, the present invention incorporates a specially formulated composition specifically designed to accommodate significant stretching in excess of 300% elongation and yet recover with sufficient force to provide a tight seal around a rotating machine element. A particularly effective elastomeric seal material may be compounded according to the following Table I, wherein the components are expressed in parts by weight. This elastomeric composition can withstand elongation in excess of 300% with an elastic memory that will restore the seal to its as-molded dimensions within eighteen hours after elongation.

TABLE I

| Ingredient | Weight Range (By Parts) |
|---|---|
| Fluoroelastomer | 90 to 110 |
| Magnesium Oxide | 4 to 8 |
| Calcium Hydroxide | 2 to 4 |
| Medium Thermal Carbon Black | 12 to 18 |
| Red Iron Oxide | 4 to 6 |
| Bituminous Coal | 4 to 6 |
| Carnauba Wax | 2 to 3 |
| Dichlorodiphenyl Sulfone | 1 to 2 |

The fluroelastomer identified above is a terpolymer of vinylidene fluoride, hexafluoroproplylene, and tetrafluoroethylene. While a fluroelastomer based material performs well, silicone based elastomers also may be formulated in a similar manner to provide the requisite elongation. The silicone based composition identified below will perform most satisfactorily, allowing a 100% to 300% elongation.

TABLE II

| Ingredient | Weight Range (By Parts) |
| --- | --- |
| Silicone Polymer | 90 to 110 |
| Magnesium Oxide | 8 to 12 |
| Mineral Filler | 10 to 20 |
| Peroxide Curative | 1 to 4 |
| Iron Oxide | 1 to 4 |

Even with a stretchable seal formed according to Table I, some type of mechanical aid is required to stretch the seal over a flange. Such aid may be provided with installation tool 50 as shown in FIG. 5. The tool is formed with a flange engaging groove 52, a smooth (less than 50 microinches RMS) seal contacting arcuate surface 54, and leverage handle 56.

Figure 6:
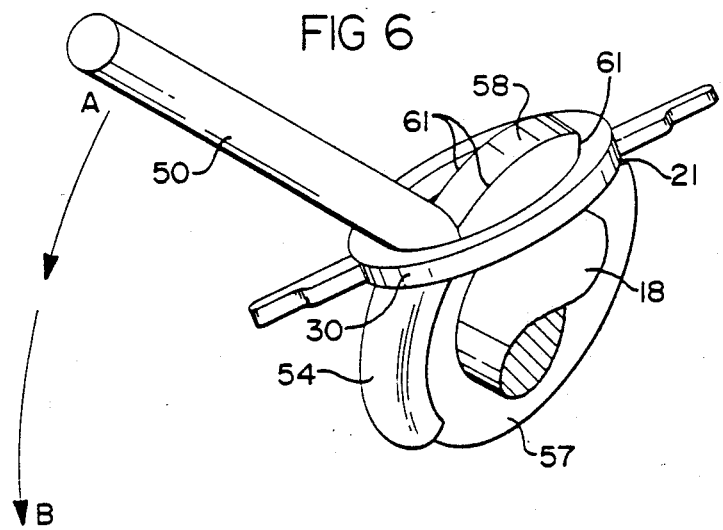
FIG. 6 is a view in perspective showing the relative position of the seal of FIG. 4 and the installation tool of FIG. 5 during assembly of the seal on the machine element of FIG. 1.
Figure 7:
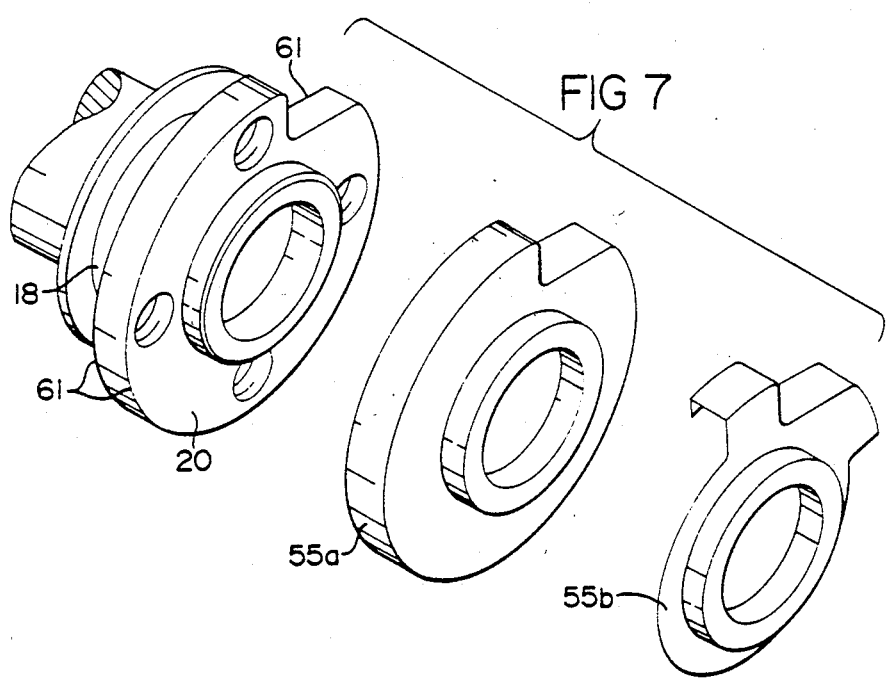
FIG. 7 is a perspective view showing two types of protective caps for preventing damage to the seal during installation.

FIG. 6 shows the general manner in which the installation tool 50 may be used. Although not shown in FIG. 6, a protective cap or covering 55 for the flange 20 may be interposed between the rear surface 57 of the flange 20, the outside annular surface 58 of the flange, the positioning notch 21 and the stretch seal 30. Examples of a full cap 55a and partial cap 55b are depicted in FIG. 7. The full cap 55a may be used with tool 66 shown in FIG. 10 while the partial cap 55b may be used with tool 50. The object of the protective cap 55 is to prevent the seal 30 from contacting sharp edges on the flange while in a stretched condition. The cap 55 could be anything from a slip-over piece of smooth vinyl to a brushed, sprayed, or dipped coating of polyurethane or the like applied directly to the flange.

The stretch seal 30 is initially applied over the flange 20 and protective cap 55, over the installation tool 50 and seated adjacent the tool handle 56 at the smooth surface 54. As seen in FIG. 6, the stretch seal is preferably seated in the positioning notch 21 during initial installation procedures. During stretching, the elongation of the seal is significantly reduced by locating the seal in notch 21 as compared to other stretching configurations which could be employed to stretch the seal over the flange 20 i.e. such as shown in FIG. 10. By minimizing the elongation of the seal during installation, installation forces are reduced and damage to the seal minimized.

To proceed with installation, one hand of the installer holds the stretch seal 30 stationary on the rear flange 20 while the installer's other hand moves the leverage handle 56 from position A to a point beyond position B in FIG. 6 so that the stretch seal 30 completely traverses the flange 20 to encircle the rear crank sealing section 18.

FIGS. 8 and 9 show examples of some of the many possible configurations that stretch seal cross-sections may take. The seal lips 32 may be plain or with hydrodynamic flutes as the application requires. FIG. 8 shows the springless stretch seal 30 with a primary lip 32 and an auxiliary lip 58 disposed in a bore 31. The housing is formed with a radially inwardly projecting collar 60 for axially positioning the seal within the bore housing. FIG. 9 shows the stretch seal 30 provided with a garter spring 64 on a single primary lip 32 and anchored in a bore 31 formed with an external groove 62. The collar 60 and the groove 62 principally function as axial positioners for restraining and aligning the seal 30 to ensure that the sealing lip is contacting the proper area of the rotating member 18. If the external radial extensions 36 as shown in FIG. 3 are not used, other means are required to fulfill their functions. The anti-rotational function might be achieved by increasing the interference between the elastomer of the seal 30 and the internal collar 60 or the external groove 62, or by the application of adhesive or sealant materials.

Another method of seal installation is shown in FIG. 10 wherein ram 66 axially pushes the seal 30 over a frustoconical positioning member 68 having an end face 69 keyed to match the surface configuration of the end face 70 of the flange 20. Ram 66 includes a shaft 72 provided with a plurality of individually pivotable fingers 74 which pivot about trunions 76. The fingers 74 are circumferentially arranged to form a generally tubular shaped bore 78. Garter spring 80 biases the fingers radially inwardly yet allows the fingers to expand or pivot radially outwardly as the ram is axially advanced over the positioning member.

As the ram pushes the seal over the positioning member, the seal is diametrically expanded to clear flange 20 and seat around sealing position 18. Preferably, the positioning member 68 is formed with an axially extending sleeve 82 which covers the flange 20 thereby serving as a protective cap such as caps 55a and 55b.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In combination, a stretchable shaft seal stretched over a crankshaft and sealing fluid between said crankshaft and a split housing, said crankshaft having a predetermined diameter and comprising a flange having a diameter substantially greater than said predetermined diameter, said housing comprising a first housing member and a second housing member, said first and second housing members defining a split bore therebetween and clamping said soil therein;

said seal comprising an elastomeric seal body having a continuous annular form and providing with an integrally molded seal lip, said seal body and said seal lip each comprising an elastomeric material which accommodates elongation over said flanged crankshaft of at least 100% of its original non-stretched length and recovers to its originally molded dimension and forms a continuous positive elastic seal around said flanged crankshaft after undergoing said elongation and wherein leak paths through said seal body are eliminated by said continuous annular form;

said seal body having an external circumferential outer surface portion compressed within said split bore and forming a continuous non-rotating annular static seal against said split bore; and said seal lip projecting from said seal body and forming said positive elastic seal as a continuous dynamic elastic seal around seal predetermined diameter of said crankshaft after being stretched over said flange.

2. The combination of claim 1, further comprising compressable gasket means extending radially outwardly from said external surface of said seal for further sealing said fluid within said split bore, said gasket means adapted to be compressed between said first and second housing members.

3. The combination of claim 2, wherein said gasket means further comprises anti-rotation means for preventing rotation of said seal within said split bore.

4. In combination, an engine crankshaft having a cylindrical sealing surface and an outwardly radiating flange for attaching the crankshaft to a flywheel;

a split housing comprising a first housing member defining a first semi-circular concave seal mount surface, and a second housing member defining a second semi-circular concave seal mount surface facing the first concave surface, and means releasably attaching the two split housing members together;

an elastomeric seal body having a continuous annular form and having a seal lip integrally formed with said seal body of an elastomeric material which accommodates elongation of at least 100% of its original non-stretched length and resiliently recovers to its originally molded dimensions to form a positive dynamic elastic seal around said shaft and wherein leak paths through said seal body are eliminated by said continuous annular form; said seal body having an outer circumferential static seal surface, and an inner circumferential dynamic elastic seal surface along said seal lip;

said seal body being seated in a space circumscribed by said split housing so that said outer circumferential seal surface is compressively engaged by said concave seal mount surfaces on said first and second housing members;

said crankshaft extending through said seal body, so that the inner circumferential seal surface of said seal body has a dynamic elastic sealing engagement with said cylindrical shaft sealing surface; and said flange on said crankshaft having a diameter that is substantially larger than the diameter of said crankshaft sealing surface, said crankshaft being constructed so that said seal body is required to be physically stretched over the crankshaft flange in order to install said seal body on said crankshaft sealing surface.

5. The combination of claim 4, wherein said split housing and said seal body have a circumferentially-extending interlocking engagement with one another, whereby said seal body is prevented from axial dislocation after said first and second housing members are attached together.

6. The combination of claim 5, wherein said interlocking engagement is provided by grooves formed in said concave seal mount surfaces of said housing members.

7. The combination of claim 4, wherein said shaft seal housing is split such that said housing members have opposed flat radial surfaces abutted together to define the housing split;

said flat radial surfaces on one of said housing members being recessed in areas immediately outboard from said outer surface of said seal body; and first and second elastomeric extension strips integrally formed on said seal body, said strips extending radially outwardly from said seal body such that said strips are seated in the recesses formed in the radial surfaces on said one housing member; said extension strips constituting a positive means for preventing said seal body from rotating in said split housing.

8. The combination of claim 7, wherein said first and second extension strips are sized so that when said housing members are abutted together, said extension strips form compression fits within said recesses, whereby said extension strips act as sealing gaskets between said housing members.

* * * * *

UNITED STATES PATENT AND TRADEMARK OFFICE
CERTIFICATE OF CORRECTION

PATENT NO. : 4,907,811

DATED : March 13, 1990

INVENTOR(S) : Stephen E. Nash and Gerald P. Pichler

It is certified that error appears in the above-identified patent and that said Letters Patent is hereby corrected as shown below:

Column 4, line 63, "fluroelastomer" should read -- fluoroelastomer --.

Column 4, line 65, "fluroelastomer" should read -- fluoroelastomer --.

Column 6, line 41, "soil" should read -- seal --.

Column 6, line 43, "providing" should read -- provided --.

Column 6, line 60, "seal" (second occurrence) should read -- said --.

Signed and Sealed this

Twenty-first Day of April, 1992

Attest:

HARRY F. MANBECK, JR.

*Attesting Officer*  *Commissioner of Patents and Trademarks*